US008306713B2

(12) United States Patent
Mayumi et al.

(10) Patent No.: US 8,306,713 B2
(45) Date of Patent: Nov. 6, 2012

(54) HYDRAULIC CONTROL DEVICE FOR AUTOMATIC TRANSMISSION

(75) Inventors: Shinsaku Mayumi, Tochigi-ken (JP); Kazuhiko Kitano, Shimotsuke (JP); Yoshikazu Nemoto, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 476 days.

(21) Appl. No.: 12/436,824

(22) Filed: May 7, 2009

(65) Prior Publication Data
US 2009/0281699 A1 Nov. 12, 2009

(30) Foreign Application Priority Data
May 9, 2008 (JP) ................. 2008-124087

(51) Int. Cl.
*G06F 19/00* (2011.01)
(52) U.S. Cl. ............ 701/66; 701/51; 701/87; 475/116; 475/125
(58) Field of Classification Search .................. 701/51, 701/87, 66; 477/155, 143; 475/116, 125
See application file for complete search history.

(56) References Cited

U.S. PATENT DOCUMENTS

| | | | | |
|---|---|---|---|---|
| 5,704,871 A | * | 1/1998 | Furukawa et al. | 477/62 |
| 6,068,576 A | * | 5/2000 | Tsutsui et al. | 477/144 |
| 6,503,165 B1 | * | 1/2003 | Kubo et al. | 475/125 |
| 2002/0022549 A1 | * | 2/2002 | Saito et al. | 477/143 |
| 2002/0151408 A1 | * | 10/2002 | Nishina et al. | 477/34 |
| 2008/0139361 A1 | * | 6/2008 | Miyake et al. | 477/65 |
| 2008/0242501 A1 | * | 10/2008 | Tsunekawa | 477/62 |

FOREIGN PATENT DOCUMENTS
JP 2006-125435 5/2006
* cited by examiner

*Primary Examiner* — Thomas Black
*Assistant Examiner* — Sara Lewandroski
(74) *Attorney, Agent, or Firm* — Arent Fox LLP (57) ABSTRACT

An in-gear oil pressure correcting section corrects engagement control oil pressure set up by an oil pressure supply control section over the entire range to be reduced by first predetermined pressure. An engagement determining section determines, on the basis of a torque converter slip ratio calculated by a calculating section, whether a frictional engagement element of a destination gear starts to engage or not. An addition correcting control section corrects the corrected engagement control oil pressure to add second predetermined pressure thereto in the case where engagement of the frictional engagement element has not been started yet when a timer measures first predetermined time. The addition correcting control section further corrects the corrected engagement control oil pressure to add third predetermined pressure thereto in the case where the engagement of the frictional engagement element has not been started yet when the timer measures second predetermined time.

4 Claims, 9 Drawing Sheets

HYDRAULIC CONTROL DEVICE FOR AUTOMATIC TRANSMISSION

CROSS-REFERENCE TO RELATED APPLICATION

The present disclosure relates to subject matter contained in Japanese Patent Application No. 2008-124087, filed on May 9, 2008, the disclosure of which is expressly incorporated herein by reference in its entirety.

BACKGROUND OF THE INVENTION

1. Field of the Invention

The present invention relates to a hydraulic control device for an automatic transmission of a vehicle, and particularly, the present invention relates to a hydraulic control device for an automatic transmission that corrects engagement control oil pressure at in-gear control if necessary.

2. Description of the Related Art

Heretofore, a setup of engagement control oil pressure for a clutch at in-gear control is carried out so as to meet certain standards for features (setup conditions) of a hydraulic control device for an automatic transmission. The setup conditions include: variation in an oil pressure characteristic to current of a linear solenoid valve for regulating oil pressure (line pressure) of hydraulic oil; a clutch clearance (aged deterioration of the clutch); a possibility to cause shock of clutch engagement to occur at a change of the oil pressure characteristic due to a difference (change) in an environment such as temperature of AT fluid oil; time until the clutch engages; and the like.

A method of controlling a regulating section of the hydraulic control device is known in order to suppress influence of variation in the oil pressure characteristic to current due to individual variability of linear solenoid valves particularly of the setup conditions as described above (see Japanese Patent Application Publication No. 2006-125435, for example; hereinafter, referred to as "Patent Document 1"). In this method, characteristic values of output oil pressure such as original oil pressure and oil temperature to a command value of the output oil pressure of the linear solenoid valve are actually measured in advance; the characteristic values are stored in a memory of an electronic control unit; and the regulating section of the hydraulic control device is controlled by reading out the characteristic values from the memory.

In the hydraulic control device for the automatic transmission disclosed in Patent Document 1, the characteristic values of the output oil pressure thus actually measured are encoded with a two-dimensional code such as a bar code, and it is attached (or applied) to a surface of the transmission. Then, in a manufacturing process of a vehicle, this two-dimensional code is read out to store the characteristic values in the memory. By carrying out a setup of the engagement control oil pressure on the basis of the characteristic values, it is possible to suppress influence of variation in the oil pressure characteristic to current due to individual variability of linear solenoid valves.

However, in the hydraulic control device for the automatic transmission disclosed in Patent Document 1, the influence of the variation in the oil pressure characteristic to current of the linear solenoid valves can be suppressed effectively, but in the hydraulic control device for the automatic transmission, it needs a step of actually measuring the above characteristic values in advance, a step of encoding them into a two-dimensional code, and a step of reading out this two-dimensional code to store it in a memory in a manufacturing process of a vehicle. Therefore, there has been a problem that it is complicated to carry out such steps for the linear solenoid valve used in the regulating section of the hydraulic control device for the automatic transmission, and this causes manufacturing costs of the vehicle to be increased.

Further, by carrying out control of regulation in the hydraulic control device for the automatic transmission using the above characteristic values, it is possible to heighten setup accuracy of original oil pressure and output oil pressure to oil temperature, but there has been a problem that it is impossible to improve resistance (toughness) against a change in a state of the automatic transmission such as deteriorated state (aged deterioration) due to abrasion of a clutch disk.

In the case where a transmission (automatic transmission) provided with a linear solenoid valve whose variation in an oil pressure characteristic to current is large is applied to a vehicle sensitive to shock (in particular, a saloon car (sedan type of vehicle) in which vehicle weight to output of an engine is light), in-gear control for a clutch must be set up in consideration of a change in a state such as temperature change and a deteriorated state. In the case where it takes much time until the clutch engages or there is a region in which shock at clutch engagement cannot be absorbed, squat in-gear control in which clutches of a low gear and higher gear are caused to engage with together, and the like have been utilized. However, there has been a problem that in the squat in-gear control, since it is necessary to operate two clutches, not only there is a possibility to be affected by the variation in the oil pressure characteristic to current, but also a usable temperature range for the squat in-gear control is limited.

SUMMARY OF THE INVENTION

The present invention is made in view of the above points, and it is an object of the present invention to provide a hydraulic control device for an automatic transmission capable of improving variation in clutch engaging time due to an oil pressure characteristic to current of a linear solenoid valve and resistance against shock at engagement of a clutch, whereby single in-gear control of a low gear can be carried out.

In order to solve the problems described above, a hydraulic control device for an automatic transmission according to the present invention is a hydraulic control device for an automatic transmission for a vehicle, the vehicle including a torque converter (2) connected to an output shaft of an engine (1) and an automatic transmission (3, 6) connected to the torque converter (2), the automatic transmission (3, 6) having a plurality of power transmission paths and a plurality of frictional engagement elements, the automatic transmission (3, 6) causing any of the plurality of frictional engagement elements to selectively engage in accordance with a running state of the vehicle to select any power transmission path from the plurality of power transmission paths, thereby being capable of setting up any gear from a plurality of gears. In this case, the hydraulic control device (6, 10) for the automatic transmission includes an oil pressure supply control section (61) that sets up engagement control oil pressure to the frictional engagement element so as to shift a current gear to a destination gear in accordance with a shift command, the oil pressure supply control section controlling supply of hydraulic oil with the engagement control oil pressure thus set up.

The hydraulic control device (6, 10) for the automatic transmission also includes an in-gear oil pressure correcting section (102) that corrects the engagement control oil pressure set up by the oil pressure supply control section (61) over the entire range (time domain) so as to be reduced by first predetermined pressure (for example, 0.2 kgf/cm²) at in-gear control.

The hydraulic control device (6, 10) for the automatic transmission also includes a calculating section (103) for calculating a torque converter slip ratio (ETR) of the torque converter (2) on the basis of the number of revolutions (Ne) of an input shaft of the torque converter (2) and the number of revolutions (Ni) of an output shaft thereof (2).

The hydraulic control device (6, 10) for the automatic transmission also includes an engagement determining section (104) that determines, on the basis of the torque converter slip ratio (ETR) calculated by the calculating section (103), whether the frictional engagement element of the destination gear starts to engage or not.

The hydraulic control device (6, 10) for the automatic transmission also includes a timer (101) for measuring elapsed time from start of the in-gear control.

The hydraulic control device (6, 10) for the automatic transmission also includes an addition correcting control section (105) that corrects the engagement control oil pressure corrected by the in-gear oil pressure correcting section (102) so as to add second predetermined pressure (P1) thereto in the case where the engagement determining section (104) determines that engagement of the frictional engagement element (here, a Low clutch corresponding to a low gear) has not been started yet when the timer (101) measures the first predetermined time (T1).

In this case, the addition correcting control section (105) further corrects the corrected engagement control oil pressure, to which the second predetermined pressure (P1) is added, so as to add third predetermined pressure (P2) thereto in the case where the engagement determining section (104) determines that the engagement of the frictional engagement element has not been started yet when the timer (101) measures second predetermined time (T2) longer than the first predetermined time (T1).

According to the hydraulic control device for the automatic transmission of the present invention, the hydraulic control device is constructed as follows. The engagement control oil pressure set up by the oil pressure supply control section at in-gear control is corrected so as to be reduced by the first predetermined pressure over the entire range, it is determined, on the basis of the torque converter slip ratio calculated by the calculating section, whether engagement of the frictional engagement element (in the present invention, a Low clutch at in-gear control) to the destination gear is started or not. In the case where the engagement determining section determines that the engagement of the frictional engagement element is not started when the timer measures the first predetermined time, the engagement control oil pressure corrected by the in-gear oil pressure correcting section is corrected so as to add the second predetermined pressure thereto. In the case where the engagement determining section determines that the engagement of the frictional engagement element is not started when the timer measures the second predetermined time, the engagement control oil pressure corrected so as to add the second predetermined pressure thereto is corrected so as to further add the third predetermined pressure thereto. Thus, by monitoring the torque converter slip ratio to early detect delay in oil pressure by a linear solenoid valve of variation lower limit of the oil pressure characteristic to current, it is possible to add and correct the oil pressure command value appropriately. This makes it possible to improve (that is, eliminate) delay feeling due to delay in engagement of the frictional engagement element (for example, as if a driver recognizes delay in response) and engagement shock of the frictional engagement element. Therefore, it is possible to improve variation in clutch engaging time due to an oil pressure characteristic to current and resistance (toughness) against shock at engagement of a clutch as described above, and this makes it possible to select single in-gear control of a first gear (Low gear).

In the hydraulic control device for the automatic transmission according to the present invention, it is preferable that the first predetermined pressure corresponds to the maximal value of variation in supply oil pressure due to individual variability of a linear solenoid valve for regulating line pressure in the hydraulic control device (6). Here, the maximal value of the variation in supply oil pressure means a difference of the oil pressure from the variation center of the variation in oil pressure against a predetermined current value to variation upper limit (plus) or variation lower limit (minus) in the oil pressure. In the present invention, the value is 0.2 kgf/cm², for example.

In the hydraulic control device for the automatic transmission according to the present invention, it is preferable that the first predetermined pressure is the same as or higher than the second predetermined pressure or the third predetermined pressure. In the hydraulic control device for the automatic transmission according to the present invention, by correcting the engagement control oil pressure set up by the oil pressure supply control section so as to be reduced by the first predetermined pressure, it is possible to ensure merchantability of a vehicle (automatic transmission) with an upper limit of variation in the oil pressure characteristic to current of the linear solenoid valve. In the case where delay of engagement of a frictional engagement element (clutch) occurs, variation in clutch engaging time and resistance against shock at engagement of the clutch can be improved by correcting the engagement control oil pressure so as to add the second predetermined pressure or the third predetermined pressure thereto.

In the hydraulic control device for the automatic transmission according to the present invention, it is preferable that addition of the second predetermined pressure or the third predetermined pressure by the addition correcting control section (105) is carried out gradually. Thus, an inclination of the engagement control oil pressure thus set up and corrected can be made gentle at timing of the engagement of the frictional engagement element (clutch). Therefore, even in the case where the addition correcting control section carries out addition and correction, it is possible to effectively suppress engagement shock of the frictional engagement element (clutch).

In this regard, reference numerals in parenthesis described above exemplify, for reference, corresponding components of an embodiment (will be described later). Further, time and oil pressure in parenthesis described above exemplify ones corresponding to the embodiment.

According to the present invention, in the hydraulic control device for the automatic transmission, it is possible to improve variation in clutch engaging time due to an oil pressure characteristic to current of a linear solenoid valve and resistance (toughness) against shock at engagement of a clutch. This makes it possible to carry out single in-gear control of a first gear (Low gear).

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings.

DETAILED DESCRIPTION OF THE INVENTION

Hereinafter, a preferred embodiment of a hydraulic control device for an automatic transmission according to the present invention will be described in detail with reference to the appending drawings.

Figure 1:
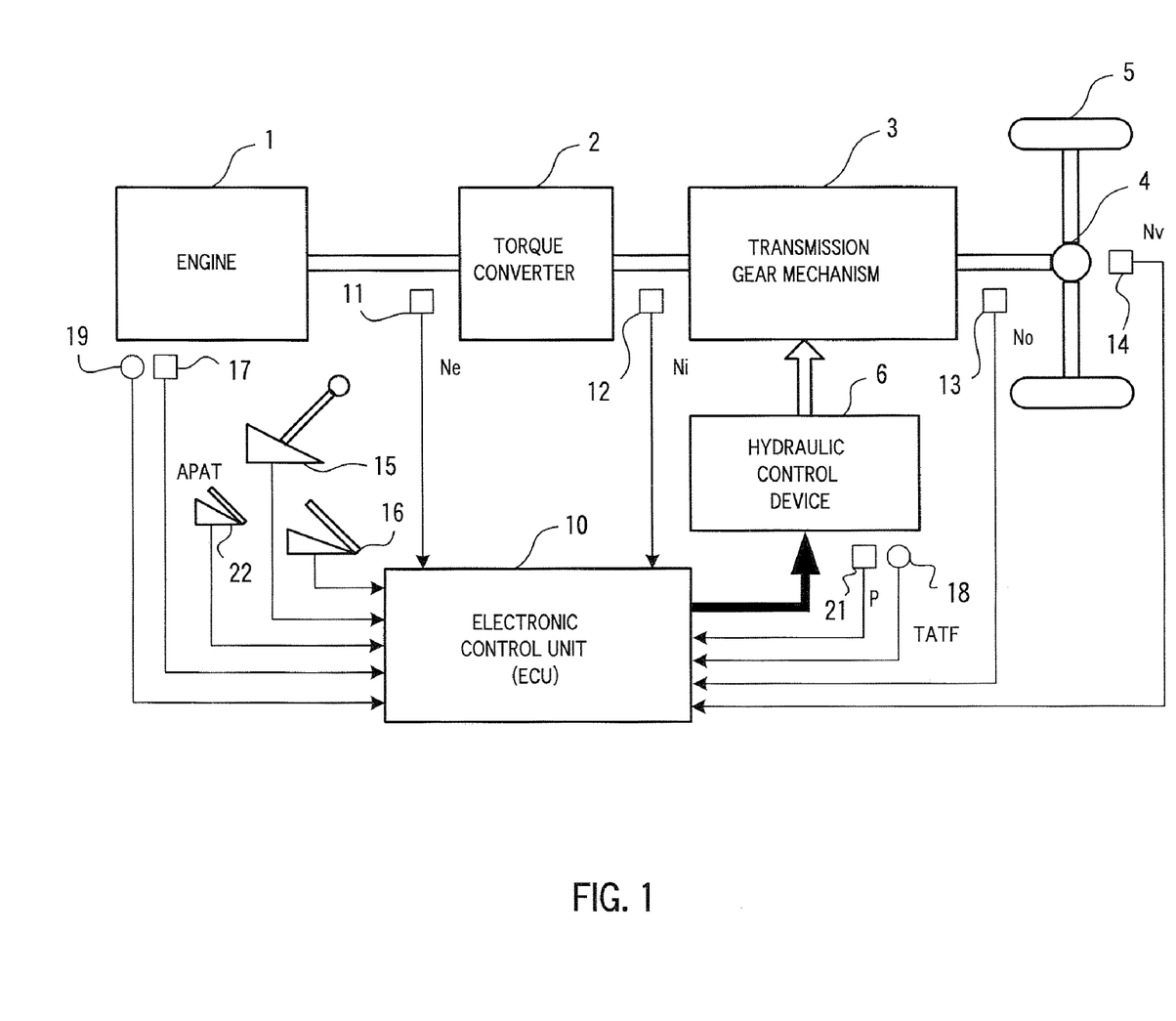
FIG. 1 is a block diagram schematically showing a power transmission system and a control system for a vehicle provided with a hydraulic control device for an automatic transmission according to one embodiment of the present invention.

FIG. 1 is a block diagram schematically showing a power transmission system and a control system for a vehicle provided with a hydraulic control device for an automatic transmission according to one embodiment of the present invention. The power transmission system for the vehicle includes: an engine 1 that is a power source; a torque converter 2 that is a fluid coupling for transmitting rotation output of the engine 1 to a transmission gear mechanism 3; the transmission gear mechanism 3 that changes gears with a set speed ratio when rotation output of the torque converter 2 is inputted thereto; and a differential gear mechanism 4 that distributes (or divides) rotation output of the transmission gear mechanism 3 between right and left wheels (for example, rear wheels) 5. A hydraulic control device 6 is provided so as to be attached to the torque converter 2 and the transmission gear mechanism 3. This hydraulic control device 6 carries out lock-up of the torque converter 2 and a setup of an input/output speed ratio to a required gear in the transmission gear mechanism 3 by causing a plurality of frictional engagement elements (clutches and the like) of an oil pressure control type provided in the torque converter 2 and the transmission gear mechanism 3 to engage or release with predetermined combination. An automatic transmission of the vehicle is configured by the torque converter 2, the transmission gear mechanism 3, the hydraulic control device 6 and the like.

The control system for controlling the power transmission system of the vehicle is constructed by sensors provided at respective portions of the vehicle, an electronic control unit (ECU) 10 to which output of each of the sensors is inputted, the hydraulic control device 6 controlled by the electronic control unit 10 and the like. A rotation sensor 11 detects the number of revolutions (the number of revolutions of the engine 1) Ne of an input shaft of the torque converter 2. A rotation sensor 12 detects the number of revolutions Ni of an input shaft of the transmission gear mechanism 3 (that is, an output shaft of the torque converter 2). A rotation sensor 13 detects the number of revolutions No of an output shaft of the transmission gear mechanism 3. A vehicle speed sensor 14 detects vehicle speed Nv of the vehicle. In this regard, without providing the vehicle speed sensor 14 specifically for detecting the vehicle speed Nv, the vehicle speed Nv may be calculated on the basis of the number of revolutions Ni of the input shaft or the number of revolutions No of the output shaft. For example, the vehicle speed Nv can be detected (or calculated) on the basis of a relational expression such as "Nv=Ni×(transmission gear ratio)×(circumferential length of tire)" or "Nv=No×(circumferential length of tire)". A shift lever position sensor 15 detects a position of a shift lever operated by a driver. As is known in the art, the positions of the shift lever include P (parking), R (reverse drive), N (neutral), and D (forward drive by automatict ransmission mode), for example. Moreover, positions for manually specifying a specific gear such as third, second or low may be provided.

A brake sensor 16 detects that a brake pedal is pressed by a predetermined amount by the driver and brake is thereby applied. A throttle sensor 17 detects the degree of opening of a throttle of the engine 1 that is set up in accordance with pressing of an accelerator pedal. An accelerator pedal sensor 22 detects the degree of opening of the accelerator pedal APAT in accordance with pressing of the accelerator pedal. An ATF temperature sensor 18 detects temperature (ATF oil temperature) TATF of hydraulic oil in the hydraulic control device 6. An oil pressure sensor 21 detects line pressure P regulated by means of a linear solenoid valve (not shown in the drawings) in the hydraulic control device 6. A cooling water temperature sensor 19 detects temperature of cooling water for the engine 1 (cooling water temperature).

Any known configuration may be adopted as a concrete configuration of the power transmission system and the control system for the vehicle shown in FIG. 1. The hydraulic control device for the automatic transmission according to the present invention includes the electronic control unit 10 and the hydraulic control device 6, and is implemented as one of various control functions that the electronic control unit 10 can carry out. In an embodiment described below, the hydraulic control device for the automatic transmission according to the present invention is implemented by computer programs equipped by the electronic control unit 10. However, the hydraulic control device for the automatic transmission according to the present invention is not limited to such computer programs, but can of course be configured by dedicated electronic circuit hardware.

Figure 2:
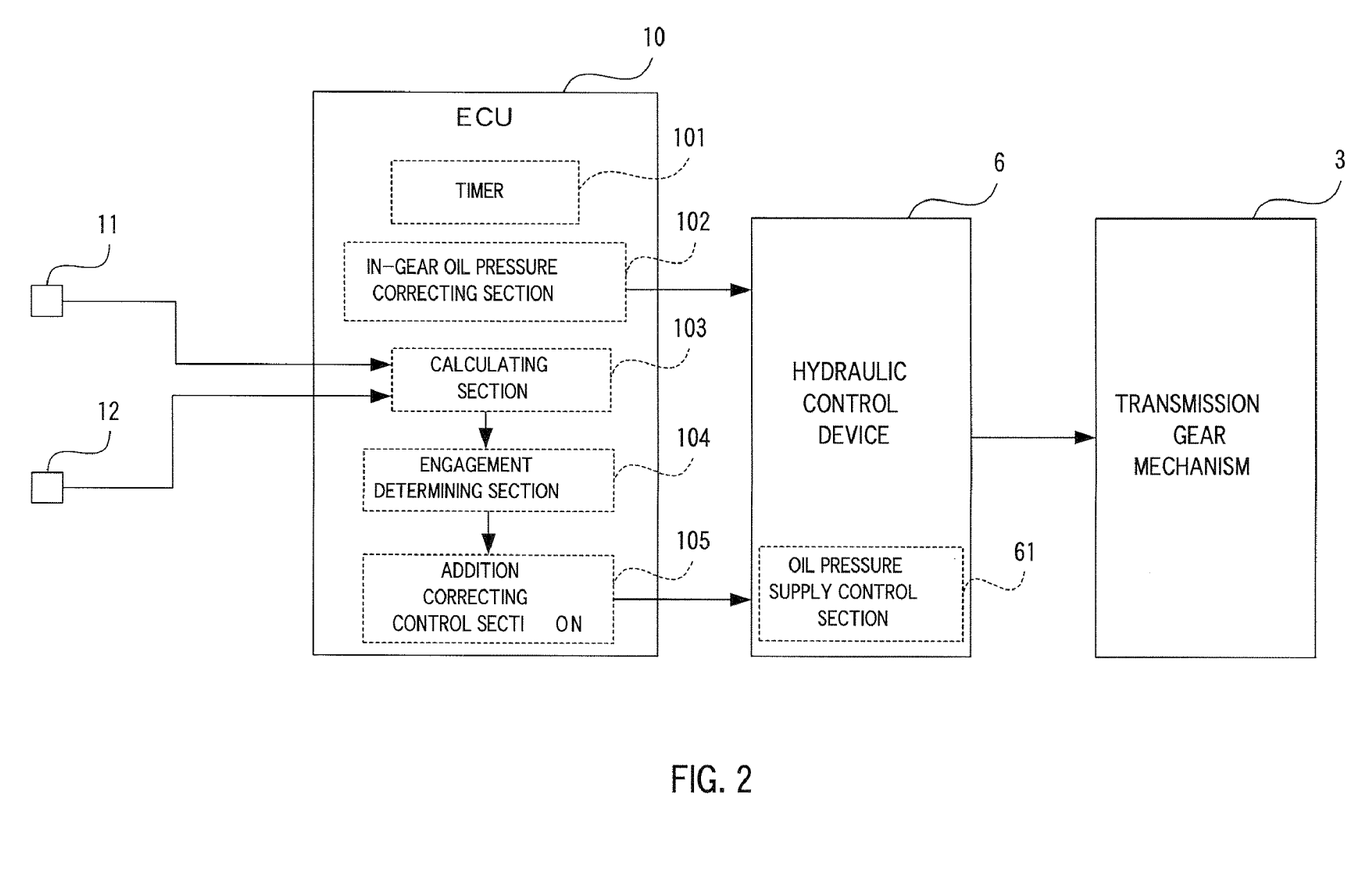
FIG. 2 is a view showing a control system for in-gear control that is carried out in the hydraulic control device for the automatic transmission according to the present invention.

FIG. 2 is a view showing a control system for in-gear control that is carried out in the hydraulic control device for the automatic transmission according to the present invention. As shown in FIG. 2, the electronic control unit 10 includes: a timer 101; an in-gear oil pressure correcting section 102; a calculating section 103; an engagement determining section 104; and an addition correcting control section 105. Further, the hydraulic control device 6 includes an oil pressure supply control section 61.

The oil pressure supply control section 61 sets up engagement control oil pressure to a frictional engagement element (clutch) so as to carry out shifting from a current gear to a destination gear in accordance with a shift command from the electronic control unit 10, and controls supply of the engagement control oil pressure thus set up. The timer 101 measures elapsed time since in-gear control started. The in-gear oil pressure correcting section 102 corrects the engagement control oil pressure set up by the oil pressure supply control section 61 so as to reduce first predetermined pressure from the engagement control oil pressure over the entire range at in-gear control. In the present embodiment, as will be described later, the first predetermined pressure is 0.2 kgf/cm², for example. The calculating section 103 calculates a torque converter slip ratio ETR (=Ne/Ni) of the torque converter 2 on the basis of the number of revolutions (Ne) and the number of revolutions (Ni) of the input shaft and the output shaft of the torque converter 2 acquired from the rotation sensors 11, 12. The engagement determining section 104 determines, on the basis of the torque converter slip ratio ETR calculated by the calculating section 103, whether a frictional engagement element (clutch) of the destination gear starts to engage or not. In the present embodiment, the engagement determining section 104 may determine that the clutch of the destination gear starts to engage when the torque converter slip ratio ETR becomes a predetermined threshold value e or less. The predetermined threshold value e is 80%, for example. In order to determine the progress of the in-gear control in this manner, it is preferable that the torque converter slip ratio ETR that is not influenced by environmental change of oil temperature, first idle or the like is utilized. In the present embodiment, as described above, it can be determined that the engagement of the Low clutch is started at the in-gear control when the torque converter slip ratio ETR becomes the predetermined threshold value e or less. In the case where the engagement determining section 104 determines that the engagement of the frictional engagement element is not started when the timer 101 measures first predetermined time T1, the addition correcting control section 105 corrects the engagement control oil pressure corrected by the in-gear oil pressure correcting section 102 so as to add second predetermined pressure thereto. Further, in the case where the engagement determining section 104 determines that the engagement of the frictional engagement element is not started when the timer 101 measures second predetermined time T2 longer than the first predetermined time T1, the addition correcting control section 105 corrects the engagement control oil pressure corrected so as to add the second predetermined pressure thereto so as to further add third predetermined pressure thereto. In this regard, the first and second predetermined time T1, T2 may be set up in consideration of in-gear time (clutch engaging time) when variation in the oil pressure characteristic to current of the linear solenoid valve is variation lower limit, variation upper limit or the variation center thereof. For example, the first predetermined time T1 may be set up so as to become the similar clutch engaging time when a linear solenoid valve whose variation in the oil pressure characteristic to current is the variation center is used. Further, the second predetermined time T2 is set up in consideration of the case where engagement of the clutch is not started though the second predetermined pressure is added to the oil pressure command value at the first predetermined time T1. In this regard, when addition of the oil pressure command values is continued, an inclination of the oil pressure command value (oil pressure/time) becomes steep. In the case where the clutch engages such timing, there is a possibility that shock of clutch engagement occurs. For that reason, in view of merchantability of the vehicle, in order to make the inclination of the oil pressure command value gentle even when addition and correction are made, it is preferable that a difference between first and second predetermined time is about 0.3 seconds or more.

Figure 3A:
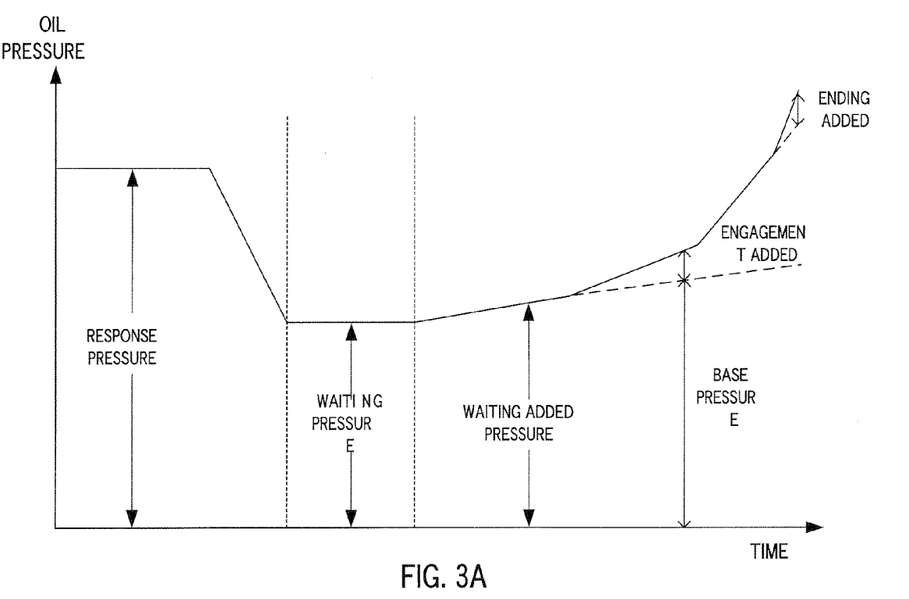
FIG. 3 is a view for explaining single in-gear control of a low gear.
Figure 3B:
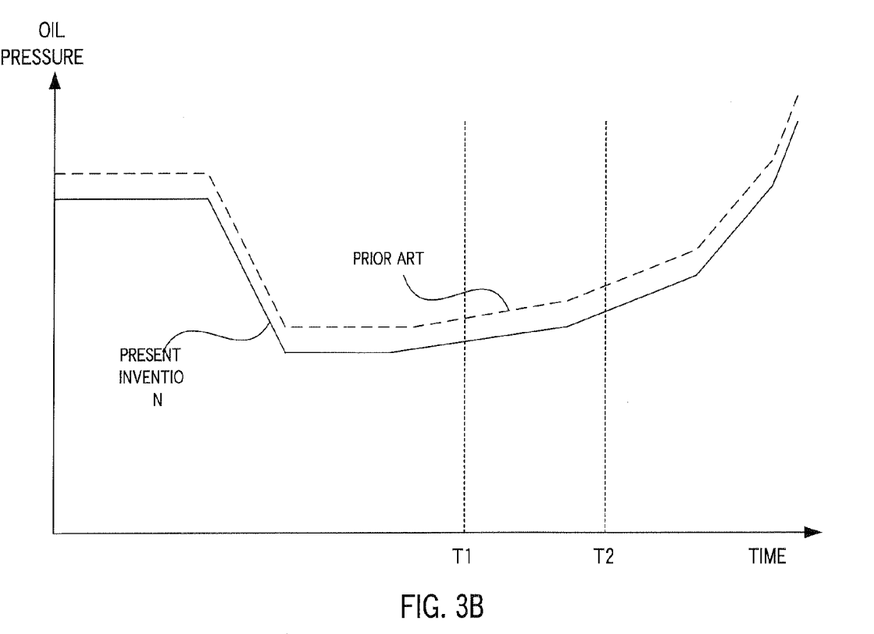

FIG. 3 is a view for explaining single in-gear control of the low gear. FIG. 3A shows an oil pressure command value that becomes a base of conventional in-gear control, and FIG. 3B shows an oil pressure command value that becomes a base of new in-gear control carried out in the present embodiment. As shown in FIG. 3A, in the conventional in-gear control, response pressure for causing a clutch to have a torque capacity at in-gear start is first outputted as an oil pressure command value. This response pressure is determined on the basis of the temperature (ATF oil temperature) TATF of the hydraulic oil detected by the ATF temperature sensor 18 and the number of revolutions Ne of the engine 1 detected by the rotation sensor 11. Next, waiting pressure for waiting without raising the oil pressure command value until actual oil pressure follows the command value is outputted. This waiting pressure is determined on the basis of the vehicle speed Nv detected by the vehicle speed sensor 14 and the degree of opening of the throttle of the engine 1 detected by the throttle sensor 17. Waiting added pressure for adding oil pressure until the clutch engages is finally outputted. Additional amount of this waiting added pressure is determined in accordance with the number of revolutions Ni of the input shaft (main shaft of the engine 1) detected by the rotation sensor 12. As shown in FIG. 3A, the waiting added pressure is constructed from BASE pressure linearly increasing the oil pressure, engagement added pressure adding oil pressure in a stepwise manner until the clutch engages, and ending added pressure further adding ending pressure as a final step of the in-gear control.

In the present embodiment, as shown in FIG. 3B, a base of the oil pressure command value is corrected by the in-gear oil pressure correcting section 102 so that the engagement control oil pressure set up by the oil pressure supply control section 61 is reduced by the first predetermined pressure over the entire range (time domain) at the in-gear control as described above. As mentioned as the above problems of the present invention, a linear solenoid valve for regulating oil pressure (line pressure) of the hydraulic oil is provided in the oil pressure supply control section 61. Variation in the oil pressure characteristic to current due to individual variability of this linear solenoid valve may cause a slippage between the oil pressure command value and the actual oil pressure. It is known that a spec of the linear solenoid valve causes a variation upper limit (plus) and a variation lower limit (minus) of the oil pressure against a predetermined current value to respectively shift up and down by about 0.2 kgf/cm² against proper oil pressure that is the center of the variation. For that reason, in view of the variation lower limit, the oil pressure command value as the base is here corrected so as to be reduced over the entire range by the first predetermined pressure (for example 0.2 kgf/cm²). Thus, while merchantability of the hydraulic control device 6 provided with a linear solenoid valve of a variation upper limit is ensured, the oil pressure command value as this base works on only a linear solenoid valve of a variation lower limit. In this regard, since the oil pressure command value is lowered so as to be associated with the linear solenoid valve of the variation upper limit in this manner, delay in the clutch oil pressure may occur. In the case where timing of clutch engagement becomes late, as will be described later, shock of clutch engagement due to delay in engagement of the clutch is improved by carrying out raise in the oil pressure command value at appropriate timing.

Figure 4:
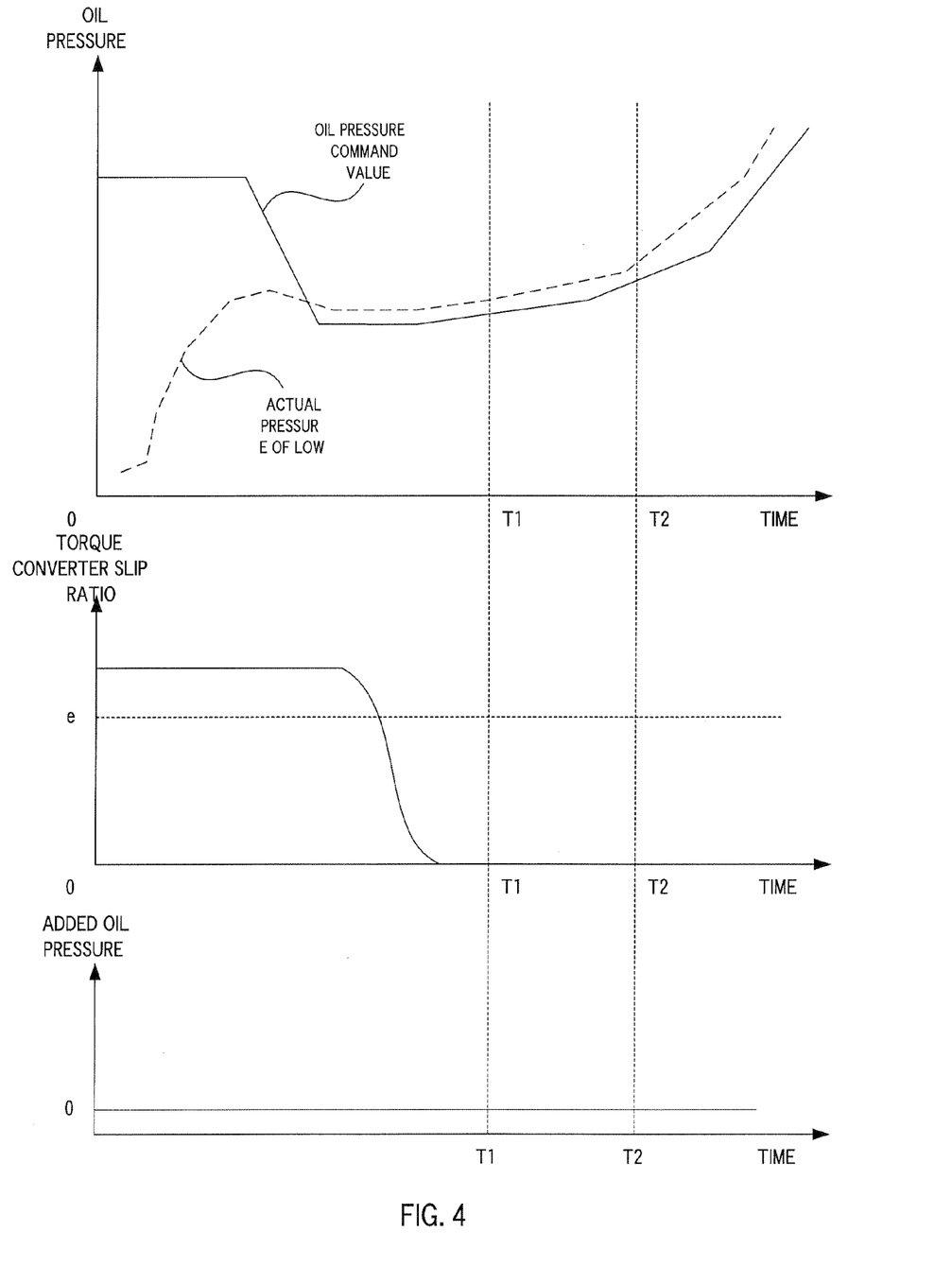
FIG. 4 is a view showing a relation between an oil pressure command value and additional oil pressure.
Figure 5:
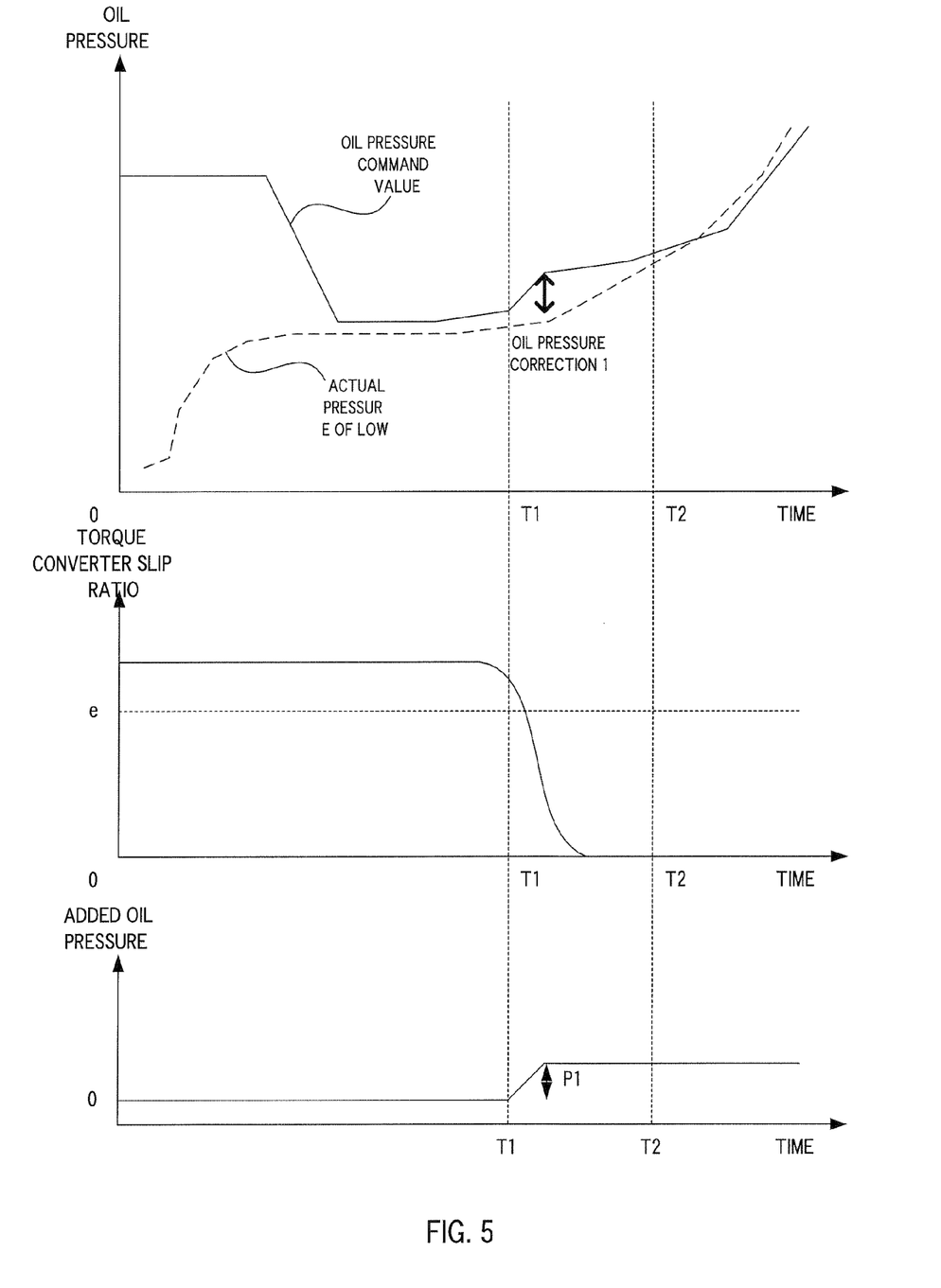
FIG. 5 is a view showing a relation between an oil pressure command value and additional oil pressure.
Figure 6:
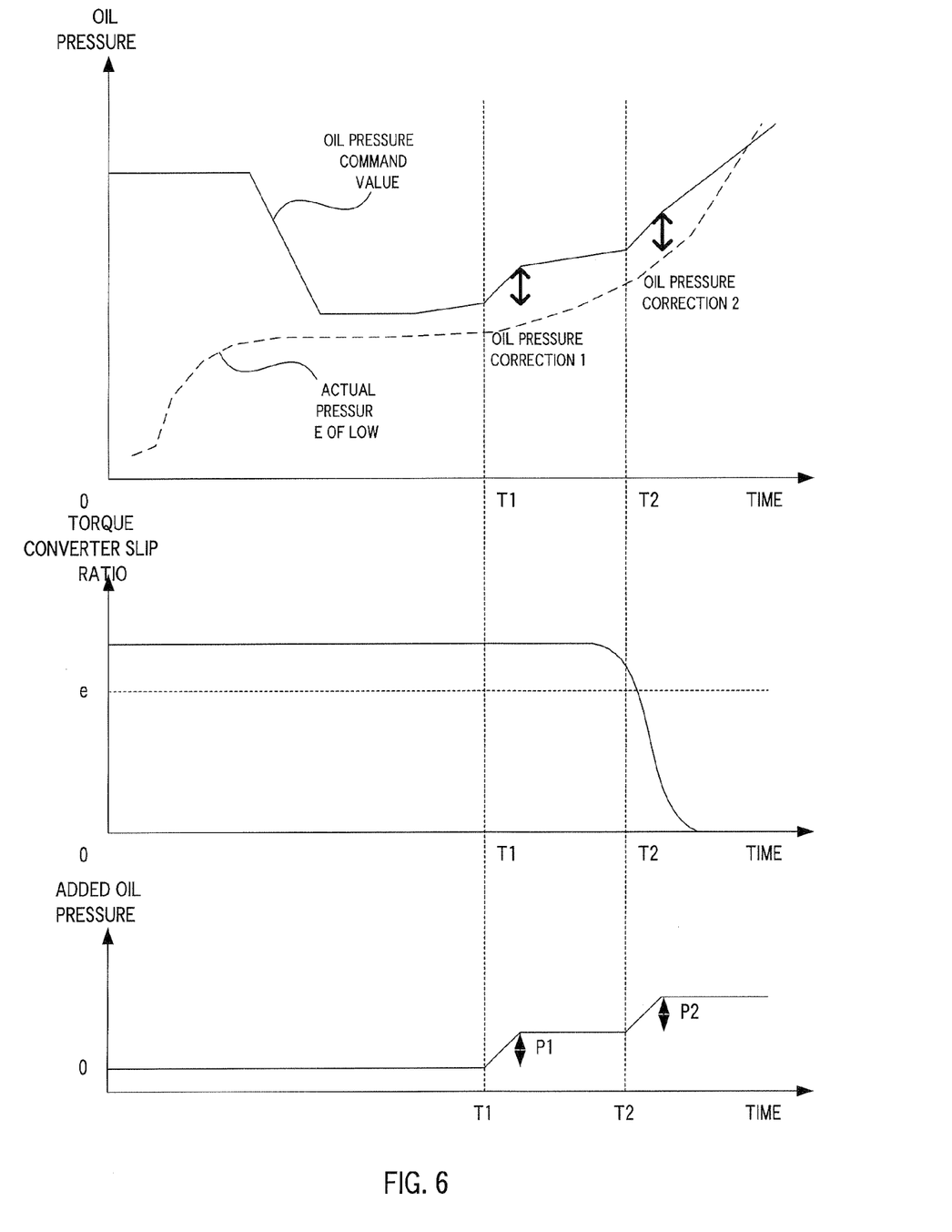
FIG. 6 is a view showing a relation between an oil pressure command value and additional oil pressure.

FIGS. 4 to 6 are views each showing a relation between an oil pressure command value and additional oil pressure. In the present embodiment, a torque converter slip ratio ETR is used to determine the progress of in-gear control (the progress of clutch engagement). Control on raise in the oil pressure command value is then carried out in accordance with the progress of the in-gear control. Thus, in the hydraulic control device for the automatic transmission according to the present invention, the torque converter slip ratio ETR is used to determine whether control for correction (raise in oil pressure) is to be introduced or not. Thus, even when an environment such as oil temperature and the number of revolutions Ne of the engine 1 is rapidly changed or even when a state of the automatic transmission is changed (for example, a deteriorated state of a clutch disk due to abrasion (aged deterioration)), it is possible to correct the oil pressure command value for the in-gear control appropriately.

Here, in the present embodiment, as described above, timing to carry out raise in the oil pressure is when to measure the first predetermined time T1 and the second predetermined time T2 since the in-gear control started by means of the timer 101. The addition correcting control section 105 determines, on the basis of the torque converter slip ratios ETR of the first and second predetermined time T1, T2, whether oil pressure (target corrected value) is to be added to the oil pressure command value or not. In the example shown in FIG. 4, since the torque converter slip ratio ETR becomes the predetermined threshold value e or less before the first predetermined time T1 elapses, the addition correcting control section 105 does not carry out addition of oil pressure to the oil pressure command value. In this case, since actual oil pressure for the Low clutch (low gear) is heightened sufficiently without carrying out addition of the oil pressure, there is no problem about merchantability.

Further, in the example shown in FIG. 5, since the torque converter slip ratio ETR does not become the predetermined threshold value e or less at the first predetermined time T1, as shown in the graph of the additional oil pressure, the addition correcting control section 105 carries out gradual addition by the oil pressure P1 with a predetermined time and a predetermined inclination from the first predetermined time T1. In the present embodiment, the additional oil pressure P1 corresponds to the second predetermined pressure and it may be about 0.2 kgf/cm$^2$ as well as the first predetermined pressure, for example. Then, since the torque converter slip ratio ETR becomes the predetermined threshold value e or less at the second predetermined time T2, the engagement determining section 104 determines that the Low clutch engages, and further addition of the oil pressure is not carried out. Further, in the example shown in FIG. 6, since the torque converter slip ratio ETR does not become the predetermined threshold value e or less at the first predetermined time T1, as shown in the graph of the additional oil pressure, the addition correcting control section 105 carries out gradual addition by the oil pressure P1 with the predetermined time and the predetermined inclination from the first predetermined time T1. Then, since the torque converter slip ratio ETR does not become the predetermined threshold value e or less even at the second predetermined time T2, as shown in the graph of the additional oil pressure, the addition correcting control section 105 further carries out gradual addition by the oil pressure P2 with a predetermined time and a predetermined inclination from the second predetermined time T2. In the present embodiment, the additional oil pressure P2 corresponds to the third predetermined pressure, and it may be about 0.2 kgf/cm$^2$ as well as the first predetermined pressure, for example. In this regard, it is preferable that the first predetermined pressure is the same as or higher than the second predetermined pressure P1 or the third predetermined pressure P2.

Thus, in the hydraulic control device for the automatic transmission according to the present embodiment, the engagement control oil pressure set up by the oil pressure supply control section 61 is corrected at the in-gear control so as to be reduced by the first predetermined pressure over the entire range. Then, in the case where engagement of the Low clutch is not completed at predetermined timing, that is, when elapsed time from start of the in-gear control becomes the first predetermined time T1 and the second predetermined time T2, the engagement control oil pressure is further corrected so as to respectively add the first and second predetermined additional oil pressure P1, P2 to the oil pressure command value. Thus, since it is possible to improve variation in the clutch engaging time due to the oil pressure characteristic to current of the linear solenoid valve and resistance (toughness) against shock at clutch engagement, it is possible to select single in-gear control of the Low clutch. Therefore, according to the hydraulic control device for the automatic transmission of the present embodiment, the single in-gear control of the Low gear can be applied to any type of vehicle independent of a configuration of the oil pressure circuit (the hydraulic control device 6) of the transmission gear mechanism 3 (transmission) or sensitivity against shock to a body of the vehicle to which the present invention is applied.

Figure 7:
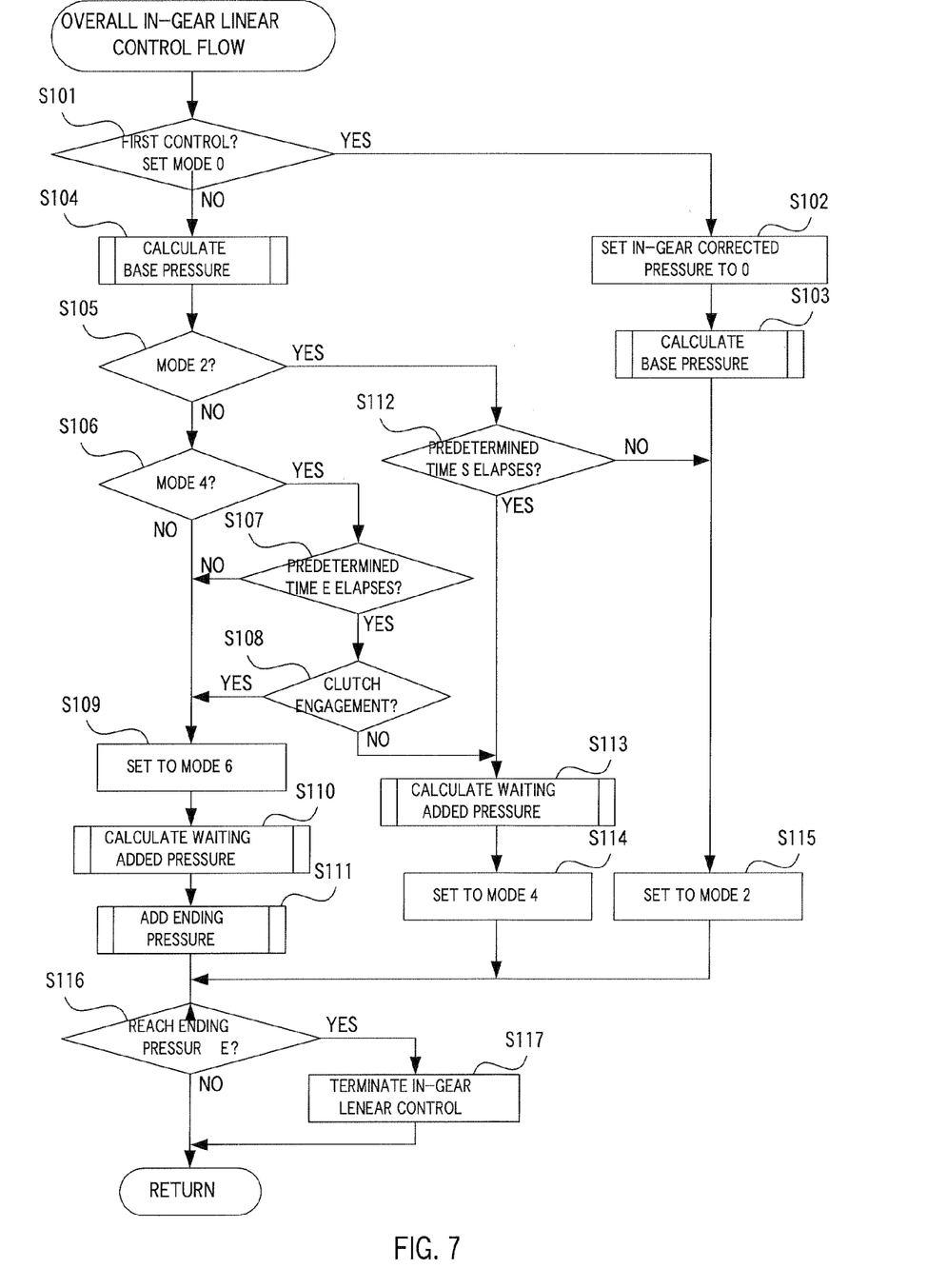
FIG. 7 is a flowchart showing an overall in-gear linear control flow.
Figure 8:
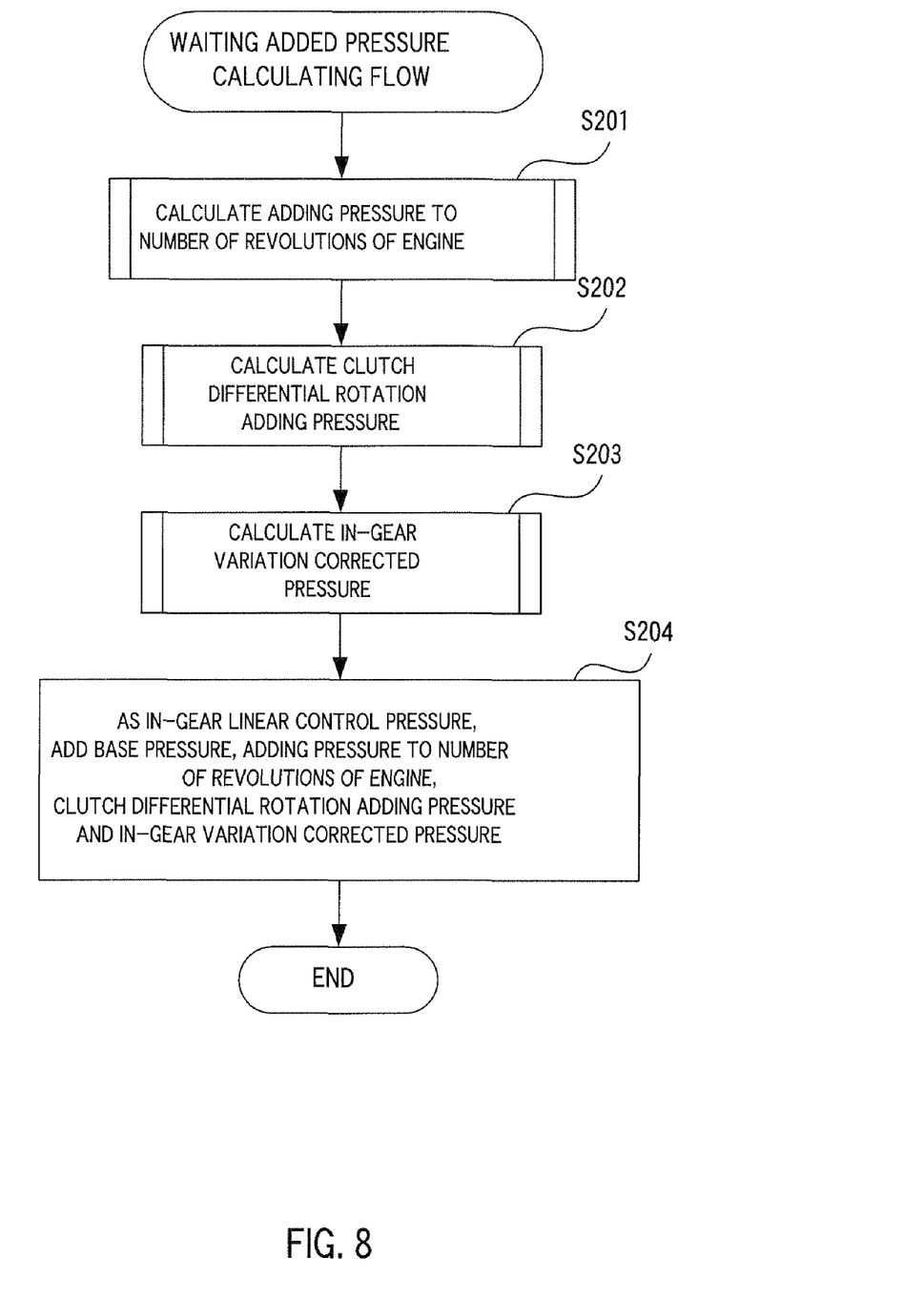
FIG. 8 is a flowchart showing a waiting added pressure calculating flow.
Figure 9:
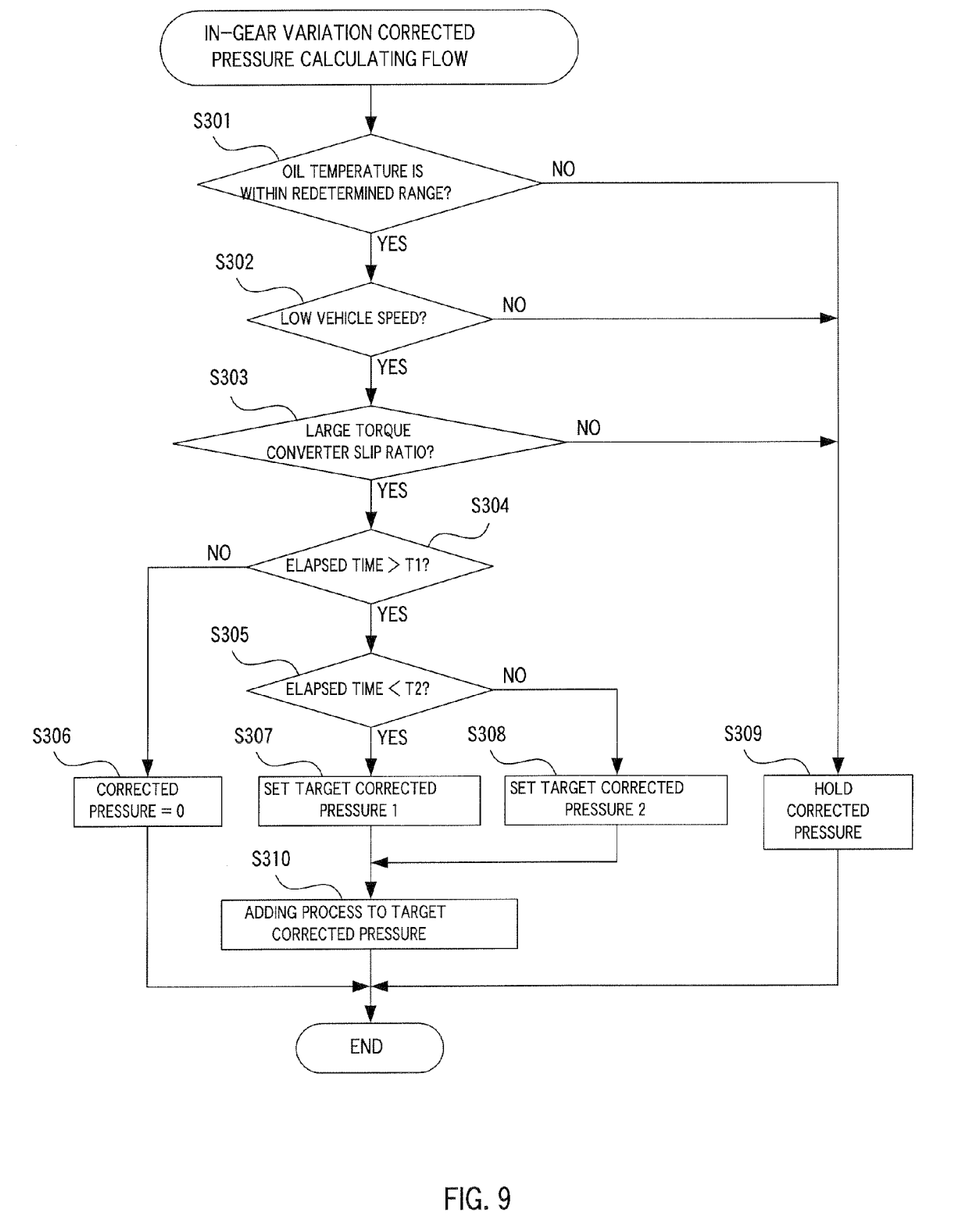
FIG. 9 is a flowchart showing an in-gear variation corrected pressure calculating flow.

Next, an operation of the hydraulic control device for the automatic transmission according to the present invention will be described with reference to flowcharts. FIG. 7 is a flowchart showing an overall in-gear linear control flow. FIG. 8 is a flowchart showing a waiting added pressure calculating flow. FIG. 9 is a flowchart showing an in-gear variation corrected pressure calculating flow.

At Step S101, the electronic control unit 10 first determines whether current in-gear control is first control or not, and sets up a mode to MODE 0. In the case where it is determined that the current in-gear control is first in-gear control, the addition correcting control section 105 sets up in-gear corrected pressure (additional oil pressure) to 0 (Step S102), the in-gear oil pressure correcting section 102 calculates base oil pressure (Step S103), and the electronic control unit 10 sets up the mode to MODE 2 (Step S115). The electronic control unit 10 then determines whether the current actual oil pressure detected by the oil pressure sensor 21 reaches ending pressure calculated at Step S103 or not (Step S116). In the case where it is determined that the actual oil pressure reaches the ending pressure, the electronic control unit 10 terminates this overall in-gear linear control flow (Step S117). In the case where it is determined that the actual oil pressure does not reach the ending pressure, the electronic control unit 10 repeats the processes from Step S101.

On the other hand, in the case where it is determined at Step S101 that the current in-gear control is not the first in-gear control, the in-gear oil pressure correcting section 102 calculates base oil pressure (Step S104). The electronic control unit 10 then determines at Step S105 whether the current mode is MODE 2 or not and at Step S106 whether the current mode is MODE 4 or not. In the case where it is determined that the mode is MODE 2, the processing flow shifts to Step S112, and the timer 101 determines whether the predetermined time S elapses since the in-gear control is started or not. In the case where it is determined that the predetermined time S does not elapse, the processing flow shifts to Step S115, and the electronic control unit 10 repeats the similar processes. Further, in the case where it is determined that the predetermined time S elapses, the electronic control unit 10 carries out the waiting added pressure calculating flow (will be described later) (Step S113), and sets up the mode to MODE 4 (Step S114). The electronic control unit 10 then repeats the processes after Step S116. Here, the predetermined time S is 0.25 seconds, for example.

In the case where it is determined at Step S106 that the mode is MODE 4, the timer 101 determines whether predetermined time E elapses since the in-gear control is started or not (Step S107). In the case where it is determined that the predetermined time E elapses, the engagement determining section 104 determines, on the basis of the torque converter slip ratio ETR calculated by the calculating section 103, whether the Low clutch engages or not (Step S108). In the case where it is determined that the predetermined time E does not elapse and it is determined that the Low clutch engages, the electronic control unit 10 sets up the mode to MODE 6 (Step S109), and carries out the waiting added pressure calculating flow (will be described later) (Step S110). The electronic control unit 10 then adds ending pressure to the oil pressure (Step S111), and repeats the processes after Step S116. On the other hand, in the case where it is determined that the predetermined time E elapses but the Low clutch does not engage, the electronic control unit 10 carries out the waiting added pressure calculating flow (will be described later) (Step S113), sets up the mode to MODE 4 (Step S114), and repeats the processes after Step S116. Here, the predetermined time E is 0.6 seconds, for example.

As described above, in the overall in-gear linear control flow, the mode is switched depending upon whether the in-gear control is first carried out or not, and appropriate processes are carried out. The base pressure and the waiting added pressure are calculated, and this overall in-gear linear control flow is finally terminated when actual oil pressure reaches the ending pressure.

Next, the waiting added pressure calculating flow carried out at Step S110 or S113 in the overall in-gear linear control flow of FIG. 7 will be described. In this process, the electronic control unit 10 first calculates adding pressure to the number of revolutions Ne of the engine 1 (Step S201). Here, in the case where the number of revolutions Ne of the engine 1 detected by the rotation sensor 11 is raised, waiting pressure is added if necessary. Subsequently, the electronic control unit 10 calculates clutch differential rotation adding pressure on the basis of the elapsed time that the timer 101 measures since the in-gear control started and a difference between the number of revolutions Ni, No of the input and output shafts of the torque converter 2 detected by the rotation sensors 11, 12 (Step S202). Here, the electronic control unit 10 changes an inclination of the base pressure (BASE pressure) shown in FIG. 3A in accordance with a size in differential rotations. The electronic control unit 10 then carries out an in-gear variation corrected pressure calculating flow (will be described later), and calculates in-gear variation corrected pressure (Step S203). The electronic control unit 10 finally adds the base pressure calculated at Step S103 or S104 in the overall in-gear linear control flow, the adding pressure to the number of revolutions Ne of the engine 1 calculated at Step S201 in the waiting added pressure calculating flow, the clutch differential rotation adding pressure calculated at Step S202 in the waiting added pressure calculating flow, and the in-gear variation corrected pressure calculated at Step S203 in the waiting added pressure calculating flow to create an oil pressure command value of in-gear linear control pressure (Step S204). The electronic control unit 10 then terminates this waiting added pressure calculating flow. The created oil pressure command value of the in-gear linear control pressure is outputted from the electronic control unit 10 to the hydraulic control device 6, and the oil pressure supply control section 61 controls supply of the engagement control oil pressure on the basis of this oil pressure command value.

In this regard, as is seen from the flowchart of FIG. 7, after the Low clutch engaged, the ending pressure is added to the oil pressure command value of the in-gear linear control pressure (see Step S111). Further, the waiting added pressure is calculated in this manner. In the case where the engagement time of the Low clutch takes the predetermined time or more even though the oil pressure supply control section 61 supplies the oil pressure, the addition correcting control section 105 adds the target corrected pressure in the in-gear variation corrected pressure calculating flow shown in FIG. 9, and the electronic control unit 10 newly creates an oil pressure command value of the in-gear linear control pressure (see Step S113). The created oil pressure command value is outputted to the hydraulic control device 6 in the same manner, and the oil pressure supply control section 61 controls the supply of the engagement control oil pressure on the basis of this oil pressure command value.

Next, the in-gear variation corrected pressure calculating flow carried out at Step S203 in the waiting added pressure calculating flow of FIG. 8 will be described. When the processing flow proceeds to Step S203 in the waiting added pressure calculating flow shown in FIG. 8, the electronic control unit 10 determines whether the temperature (ATF oil temperature) TATF of the hydraulic oil detected by the ATF temperature sensor 18 is within a predetermined temperature range or not (Step S301). In the case where it is determined that the temperature TATF of the hydraulic oil is not within the predetermined temperature range, the electronic control unit 10 holds the corrected pressure currently set up (Step S309), and terminates the in-gear variation corrected pressure calculating flow. In this regard, when this in-gear variation corrected pressure calculating flow is carried out for the first time, the in-gear corrected pressure is set to 0 (zero) at Step S102 in the overall in-gear linear control flow of FIG. 7. For that reason, in this case, the corrected pressure is held as 0. Here, the predetermined temperature range may be a range in which single in-gear control of the Low gear can be carried out appropriately, and is in the range to 110° C., for example.

In the case where it is determined that the temperature TATF of the hydraulic oil is within the predetermined temperature range, the electronic control unit 10 determines whether the current vehicle speed Nv of the vehicle detected by the vehicle speed sensor 14 is low vehicle speed (predetermined vehicle speed or lower) or not (Step S302). In the case where it is determined that the vehicle speed Nv is not low vehicle speed (that is, high vehicle speed of predetermined vehicle speed or higher), the electronic control unit 10 holds the current in-gear corrected pressure at Step S309, and terminates the in-gear variation corrected pressure calculating flow. On the other hand, in the case where it is determined that the vehicle speed Nv is low vehicle speed, the engagement determining section 104 determines whether the torque converter slip ratio ETR calculated by the calculating section 103 is larger than the predetermined threshold value e or not (Step S303). In the case where it is determined that the torque converter slip ratio ETR is not larger than the predetermined threshold value e, the electronic control unit 10 holds the corrected pressure currently set up (Step S309), and terminates the in-gear variation corrected pressure calculating flow.

In the case where it is determined at Step S303 that the torque converter slip ratio ETR is larger than the predetermined threshold value e, the electronic control unit 10 determines whether the elapsed time measured by the timer 101 is longer than the first predetermined time T1 shown in FIGS. 4 to 6 (Step S304). In the case where it is determined that the elapsed time is not longer than the first predetermined time T1, the electronic control unit 10 sets up the corrected pressure to 0 (Step S306), and terminates this in-gear variation corrected pressure calculating flow.

In the case where it is determined at Step S304 that the elapsed time is longer than the first predetermined time T1, the electronic control unit 10 subsequently determines whether the elapsed time is shorter than second predetermined time T2 (>the first predetermined time T1) or not (Step S305). In the case where it is determined that the elapsed time is longer than the first predetermined time T1 but shorter than the second predetermined time T2, the addition correcting control section 105 sets up the corrected pressure to target corrected pressure 1 (Step S307), and carries out an adding process to the target corrected pressure 1 (Step S310). The electronic control unit 10 then terminates this in-gear variation corrected pressure calculating flow. Here, the target corrected pressure 1 corresponds to the additional oil pressure P1 shown in FIG. 5. On the other hand, in the case where it is determined that the elapsed time is longer than the second predetermined time T2, the addition correcting control section 105 sets up the corrected pressure to target corrected pressure 2 (Step S308), and carries out the adding process to the target corrected pressure 2 (Step S310). The electronic control unit 10 then terminates this in-gear variation corrected pressure calculating flow.

As explained above, according to the hydraulic control device for the automatic transmission according to the present invention, the hydraulic control device for the automatic transmission is configured as follows. The oil pressure supply control section 61 sets up the engagement control oil pressure to the clutch so as to carry out shifting from the current gear to the destination gear in accordance with the shift command from the electronic control unit 10, and controls supply of the engagement control oil pressure thus set up. The in-gear oil pressure correcting section 102 corrects the engagement control oil pressure set up by the oil pressure supply control section 61 over the entire range at the in-gear control so as to be reduced by the first predetermined pressure. The calculating section 103 calculates the torque converter slip ratio ETR of the torque converter 2 on the basis of the number of revolutions Ne of the input shaft of the torque converter 2 and the number of revolutions Ni of the output shaft thereof. The engagement determining section 104 determines, on the basis of the torque converter slip ratio ETR calculated by the calculating section 103, whether the clutch of the destination gear (in the present embodiment, the Low clutch) is started to engage or not. In the case where the engagement determining section 104 determines that the engagement of the Low clutch is not started when the timer 101 measures the first predetermined time T1, the addition correcting control section 105 corrects the engagement control oil pressure corrected by the in-gear oil pressure correcting section 102 so as to add the second predetermined pressure (additional oil pressure) P1 thereto. In the case where the engagement determining section 104 determines that the engagement of the Low clutch is not started when the timer 101 measures the second predetermined time T2 longer than the first predetermined time T1, the engagement control oil pressure corrected so as to add the second predetermined pressure (additional oil pressure) P1 thereto is corrected so as to further add the third predetermined pressure (additional oil pressure) P2 thereto. Thus, by monitoring the torque converter slip ratio ETR, the delay in the oil pressure by the linear solenoid valve with variation lower limit of the oil pressure characteristic to current can be detected early, and this makes it possible to add and correct the oil pressure command value appropriately. Thus, it is possible to improve (or eliminate) delay feeling due to delay in the clutch engagement (for example, as if a driver recognizes delay in response) and engagement shock of the clutch. Therefore, it is possible to improve the variation in the clutch engaging time due to the oil pressure characteristic to current and resistance (toughness) against the shock at clutch engagement as described above, and this makes it possible to select the single in-gear control of the Low gear. The single in-gear control of the Low gear can be applied to any type of vehicle independent of a configuration of the oil pressure circuit of the transmission gear mechanism 3 (transmission) or sensitivity of a body of the vehicle to which the present invention is applied.

As described above, although the embodiments of the hydraulic control device for the automatic transmission according to the present invention have been explained in detail on the basis of the appending drawings, the present invention is not limited to these configurations. Various modifications can be made in a scope of the technical idea described in the following claims, the specification described above and the appending drawings without departing from the spirit and scope of the present invention. In this regard, even any shape, structure or function that is not described directly in the specification and the drawings falls within the technical idea of the present invention so long as the function and the effect of the present invention are achieved. Namely, each component constituting the hydraulic control device for the automatic transmission (including the oil pressure control circuit) can be replaced with any arbitrary component that can achieve the similar function to the corresponding component of the hydraulic control device for the automatic transmission. Further, arbitrary components may be added to the hydraulic control device for the automatic transmission.

What is claimed is:

1. A hydraulic control device for an automatic transmission of a vehicle, the vehicle comprising a torque converter connected to an output shaft of an engine and the automatic transmission being connected to the torque converter, the automatic transmission having a plurality of power transmission paths and a plurality of frictional engagement elements, the automatic transmission causing any of the plurality of frictional engagement elements to selectively engage in accordance with a running state of the vehicle to select any power transmission path from the plurality of power transmission paths, thereby being capable of setting up any gear from a plurality of gears, the hydraulic control device comprising:

an oil pressure supply control section configured to set up engagement control oil pressure to the frictional engagement element which is configured to shift a current gear to a destination gear in accordance with a shift command, the oil pressure supply control section controlling supply of hydraulic oil with the engagement control oil pressure thus set up;

an in-gear oil pressure correcting section configured to correct the engagement control oil pressure set up by the oil pressure supply control section wherein the engagement control oil pressure is reduced by a first predetermined pressure during an entire time span of in-gear control;

a calculating section configured to calculate a torque converter slip ratio of the torque converter based on a number of revolutions of an input shaft of the torque converter and a number of revolutions of an output shaft thereof;

an engagement determining section configured to determine, based on the torque converter slip ratio calculated by the calculating section, whether the frictional engagement element of the destination gear starts to engage;

a timer configured to measure an elapsed time from start of the in-gear control; and an addition correcting control section configured to correct the engagement control oil pressure corrected by the in-gear oil pressure correcting section and configured to add a second predetermined pressure thereto in the case where the engagement determining section determines that engagement of the frictional engagement element has not been started yet when the timer measures a first predetermined time, wherein the addition correcting control section is further configured to further correct the corrected engagement control oil pressure, to which the second predetermined pressure is added, by adding a third predetermined pressure thereto where the engagement determining section determines that the engagement of the frictional engagement element has yet to start when the timer measures a second predetermined time that is longer than the first predetermined time.

2. The hydraulic control device for the automatic transmission as claimed in claim 1, wherein the first predetermined pressure corresponds to a maximal value of a variation in a supply oil pressure due to individual variability of a linear solenoid valve for regulating line pressure in the hydraulic control device.

3. The hydraulic control device for the automatic transmission as claimed in claim 1, wherein the first predetermined pressure is equal to or greater than the second predetermined pressure or the third predetermined pressure.

4. The hydraulic control device for the automatic transmission as claimed in claim 1, wherein addition of the second predetermined pressure or the third predetermined pressure by the addition correcting control section is carried out gradually.

* * * * *